(12) United States Patent
Leiking et al.

(10) Patent No.: US 12,545,512 B2
(45) Date of Patent: Feb. 10, 2026

(54) METHOD FOR OPERATING A STORAGE ARRANGEMENT

(71) Applicant: Jungheinrich Aktiengesellschaft, Hamburg (DE)

(72) Inventors: Lars Leiking, Erding (DE); Stefan Seemüller, Unterschleißheim (DE); Marco Dewitz, Haimhausen (DE)

(73) Assignee: Jungheinrich Aktiengesellschaft, Hamburg (DE)

( * ) Notice: Subject to any disclaimer, the term of this patent is extended or adjusted under 35 U.S.C. 154(b) by 558 days.

(21) Appl. No.: 18/011,711

(22) PCT Filed: Jun. 21, 2021

(86) PCT No.: PCT/EP2021/066743
§ 371 (c)(1),
(2) Date: Dec. 20, 2022

(87) PCT Pub. No.: WO2021/259821
PCT Pub. Date: Dec. 30, 2021

(65) Prior Publication Data
US 2023/0249910 A1    Aug. 10, 2023

(30) Foreign Application Priority Data

Jun. 24, 2020  (EP) .................................. 20181836

(51) Int. Cl.
*B65G 1/04*    (2006.01)
*B65G 1/137*   (2006.01)

(52) U.S. Cl.
CPC ......... *B65G 1/0471* (2013.01); *B65G 1/1373* (2013.01)

(58) Field of Classification Search
CPC .......................... B65G 1/1373; B65G 1/0471
(Continued)

(56) References Cited

U.S. PATENT DOCUMENTS 9,008,829 B2 *  4/2015  Worsley ............... B65G 1/1378
9,656,806 B2 *  5/2017  Brazeau et al. ......... B25J 5/007
(Continued)

FOREIGN PATENT DOCUMENTS

CN    105752575    7/2016
CN    108137232    6/2018
(Continued)

OTHER PUBLICATIONS

Europe Office Action conducted in counterpart Europe Appln. No. 20 181 836.6 (Nov. 14, 2023).
(Continued)

*Primary Examiner* — Gene O Crawford
(74) *Attorney, Agent, or Firm* — GREENBLUM & BERNSTEIN, P.L.C.

(57) ABSTRACT

A method for operating a storage arrangement, in goods are inserted into the storage arrangement in an inbound delivery container at an incoming goods area, are removed from the inbound delivery container, are temporarily stored and are removed from the storage arrangement in a predetermined sequence in an outbound delivery container at an outgoing goods area. The goods are transferred from the inbound delivery container into a stackable packaging unit and the packaging unit is temporarily stored in a block storage unit. The block storage unit has multiple stacking compartments and each stacking compartment is designed to receive a stack of packaging units. The goods are removed from the block storage unit in a sequence predetermined by the outgoing goods area.

13 Claims, 4 Drawing Sheets

Figure 1:
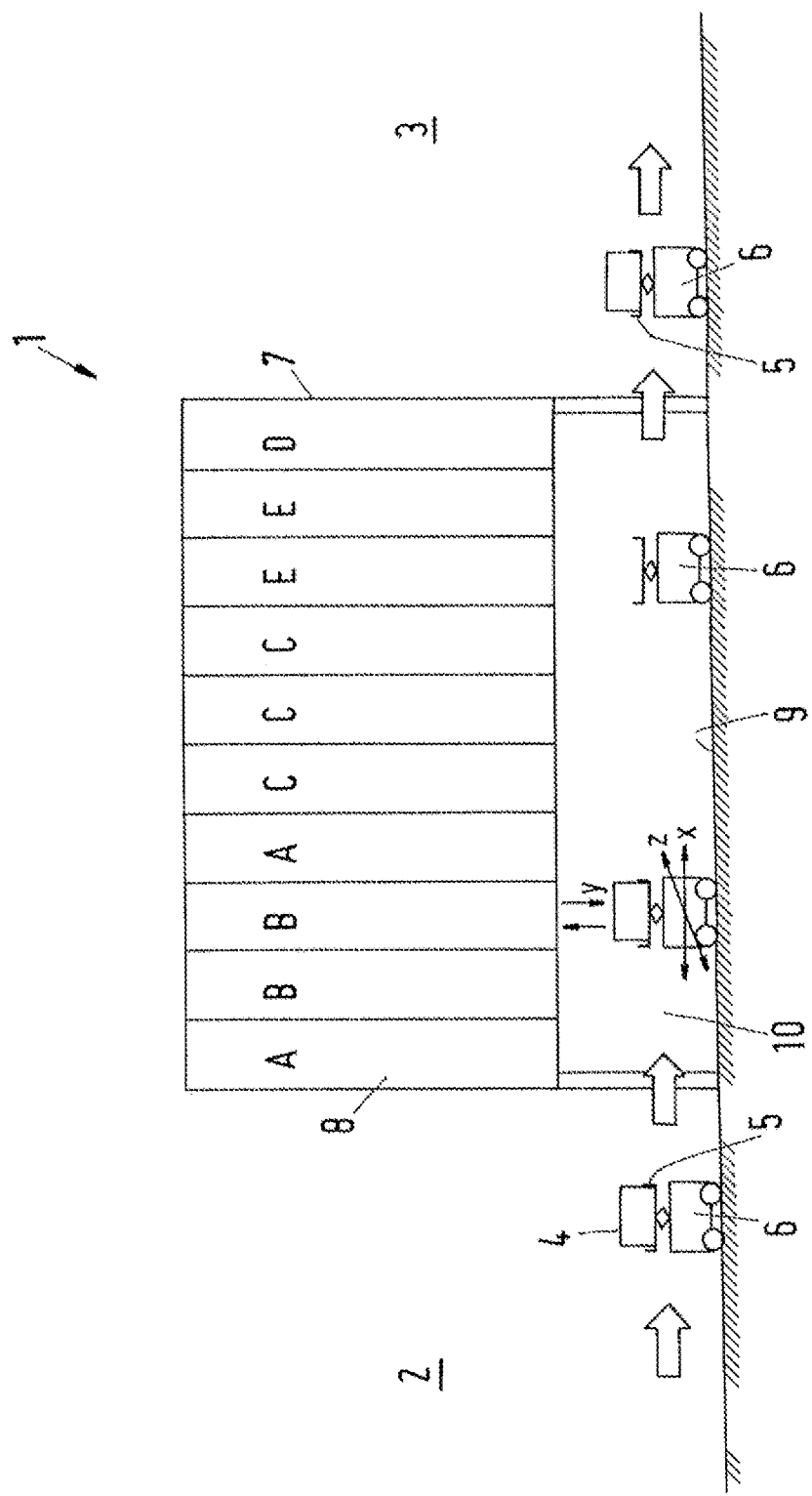

(58) Field of Classification Search
USPC .................. 700/214, 218; 414/266, 267, 807
See application file for complete search history.

(56) References Cited

U.S. PATENT DOCUMENTS

| | | | |
|---|---|---|---|
| 11,198,561 B2 | 12/2021 | Buchmann | |
| 2016/0272421 A1* | 9/2016 | Hognaland | G06F 40/284 |
| 2017/0129703 A1* | 5/2017 | Lindbo et al. | B65G 1/0464 |
| 2018/0093828 A1* | 4/2018 | Lindbo et al. | A62C 35/68 |
| 2021/0221615 A1 | 7/2021 | Buchmann | |

FOREIGN PATENT DOCUMENTS

| | | |
|---|---|---|
| CN | 110861865 | 3/2020 |
| DE | 10 2013 009 340 | 12/2014 |
| DE | 10 2018 127 567 | 5/2020 |
| EP | 0 096 784 | 12/1983 |
| EP | 3 468 899 | 9/2021 |
| JP | S60-71402 | 4/1985 |
| JP | 6592710 | 9/1993 |
| JP | H06-87512 | 3/1994 |
| JP | 2012/523358 | 10/2012 |
| JP | H05-229609 | 10/2019 |
| JP | 2021-8337 | 1/2021 |
| KR | 10-2017-0103964 | 9/2017 |
| WO | 2016/115565 | 7/2016 |
| WO | 2016/130338 | 8/2016 |
| WO | 2018/111189 | 6/2018 |
| WO | 2019/140473 | 7/2019 |
| WO | 2019/238697 | 12/2019 |
| WO | 2020/074717 | 4/2020 |
| WO | 2020/109495 | 6/2020 |

OTHER PUBLICATIONS

China Office Action (CN OA) conducted in counterpart China Appln. No. 202180044906.1 (Mar. 28, 2025).
Amazon Bürobedarf et al., Retrieved from the Internet: https://www.amazon.de/Really-Useful-schwarz-Aufbewahrung-35-Liter/dp/B06Y2G9GWK, [retrieved on Feb. 9, 2021], XP055774239, May 21, 2018, (with English language translation).
Int'l Search Report (Form PT/ISA/210) conducted in Int'l Appln. No. PCT/EP2021/066743 (Aug. 10, 2021).
Int'l Written Opinion (Form PT/ISA/237) conducted in Int'l Appln. No. PCT/EP2021/066743 (Aug. 10, 2021).
Japan Office Action conducted in counterpart Japan Appln. No. 2022-578822 (Jul. 3, 2024).
Japan Office Action conducted in counterpart Japan Appln. No. 2022-578822 (Nov. 19, 2024).
Korea Office Action (KR OA) conducted in counterpart Korea Appln. No. 10-2023-7002707 (May 29, 2025).

\* cited by examiner

METHOD FOR OPERATING A STORAGE ARRANGEMENT

The present invention relates to a method for operating a storage arrangement, with which goods are inserted into the storage arrangement in an inbound delivery container at an incoming goods area, are removed from the inbound delivery container, are temporarily stored and are removed from the storage arrangement in a predetermined sequence in an outbound delivery container at an outgoing goods area.

The method is applicable, for example, to a storage arrangement in the field of food retailing. Here, goods are delivered by one or more manufacturers, wherein the inbound delivery is made on pallets, for example, and each pallet contains a single type of goods. The goods are then removed from the inbound delivery container. This operation is also called "depalletizing." The depalletized goods are stored temporarily. Temporary storage takes place, for example, by transferring the goods into a transport container or a transportable tray and storing the transport container or tray in a temporary storage unit. In many cases, the temporary storage unit is designed as a high-bay warehouse with a stacker crane. The stacker crane stores the transport containers or trays in the high-bay warehouse and removes them from there.

At the outgoing goods area, the goods must be arranged in a predetermined sequence in the outbound delivery containers. The sequence takes into account, for example, that heavy goods are located at the bottom in the direction of gravity. Goods that are not mechanically stable should, for example, be arranged as high as possible in the direction of gravity. Accordingly, the goods must be inserted into the outbound delivery containers in a specific order. As a rule, this is not readily possible if goods are transported directly from the high-bay warehouse or a correspondingly flat warehouse to the outgoing goods area. Accordingly, a buffer station is arranged before the outgoing goods area, in which station the goods are again temporarily stored in order to then be assembled in the correct sequence in the outbound delivery container. This requires installation space and storage components, which increases costs.

The invention is based on the object of producing and/or operating a storage arrangement at low cost.

This object is achieved with a method of the type mentioned at the beginning by transferring the goods from the inbound delivery container into a stackable packaging unit and temporarily storing the packaging unit in a block storage unit, wherein the block storage unit has multiple stacking compartments and each stacking compartment is designed to receive a stack of packaging units, wherein the goods are removed from the block storage unit in a sequence predetermined by the outgoing goods area.

A block storage unit may also be referred to as a "stack storage unit" or "container stack storage unit." In a block storage unit, multiple stacking compartments are arranged in rows and columns in the manner of a matrix. Multiple packaging units are then arranged on top of one another in each stacking compartment. This means that the packaging units are arranged not only in two dimensions but in a three-dimensional structure. In this view, a high-bay warehouse also has only a two-dimensional structure, even if the individual goods are arranged on top of one another on multiple levels. However, on each level, there is only a two-dimensional arrangement of the goods in question so that the third dimension can only be achieved by approaching the levels individually with a stacker crane. This in turn means that positions in the high-bay warehouse cannot be approached at will because it is always necessary to check whether a stacker crane is available for a desired position and whether this stacker crane is not obstructed by another stacker crane moving in the same aisle in a high-bay warehouse, for example. The same applies to other storage arrangements in which the individual goods are arranged flat in one or more levels. The packaging units may have different shapes. It is essential that a packaging unit can receive goods and that the packaging unit can be stacked on another packaging unit so that multiple packaging units can form a stack even with goods received.

Preferably, the packaging units in each stacking compartment contain the same type of goods. Thus, at every point of the matrix, i.e., at every intersection of rows and columns, there is a unique assignment between position and goods. This makes it possible to easily pick up the goods in a desired order or sequence and to bring them to the outgoing goods area so that the desired sequencing can already be achieved during pickup.

Preferably, the packaging units are inserted into the stacking compartments from below. In principle, a block storage unit can be supplied from above or below. If the stacking compartments are supplied from below, i.e., the packaging units are inserted into the stacking compartments from below and also removed from the stacking compartments downward, the packaging units can be transported directly to a level leading out of the block storage unit. Further transfer operations are not necessary in this case.

Preferably, the packaging units are inserted into the stacking compartments and are removed from the stacking compartments by means of loading vehicles, which can be moved in a loading compartment below the stacking compartments. By means of the loading vehicles, it is easily possible to reach, i.e., approach, each stacking compartment without difficulty.

In this respect, it is preferred that the loading vehicles can be moved in at least two different directions. The loading vehicles can then be guided in the loading compartment to each stacking compartment so that if multiple loading vehicles are in use, they can also avoid one another. In addition, the removal of packaging units with corresponding goods from the block storage unit becomes highly flexible, which has a positive effect on sequencing at the outgoing goods area.

Preferably, the loading vehicles are used to transport the packaging units to a sequencing device upstream of the outgoing goods area. If the loading vehicles that remove the packaging units from the block storage unit can also be used outside the block storage unit, there is no need for another transfer operation so that the method can work with a small amount of time and fewer technical devices.

It is preferable to use loading vehicles that can transport more than one packaging unit simultaneously. Accordingly, a loading vehicle can initially approach a stacking compartment and remove one or more packaging units from there. If transport space is still available, the loading vehicle can then be driven to another stacking compartment to pick up another packaging unit there. The loading vehicle then does not have to be moved to the sequencing device after each pickup of a packaging unit. It is possible to already use the loading vehicle for pre-sorting the packaging units. The loading vehicle can, for example, remove different packaging units from the block storage unit, for example by approaching different stacking compartments and removing one or even multiple packaging units in each case.

Preferably, loading vehicles that transport racks are used, wherein the racks insert the packaging units into the stacking compartments and remove them from the stacking compartments.

The racks preferably have their own lifting drive with its own power supply for the device, connected to the rack, for lifting and lowering the packaging units and can thus perform storage and retrieval operations, while the loading vehicle is working elsewhere until the respective rack has completed its storage or retrieval operations and can be picked up again.

In another embodiment, it is also possible that the racks do not have their own lifting drive for the device for lifting and lowering the packaging units but are coupled to a drive in the loading vehicle by a suitable coupling device. In this case, of course, the loading vehicle remains in place until the storage or retrieval operations of the rack are completed.

Other combinations of drive and power supply of the racks with lifting device and coupling to the loading vehicle are also conceivable. For example, the drive in the rack and a wireless or contact-based power supply through the loading vehicle or via contacts or inductive loops in the floor should be mentioned. In this case, the racks can be controlled by wireless or contact-based signal transmission from the loading vehicle or a central control system.

Preferably, a packaging unit that has at least two different filling/removal directions is used. This makes the insertion and removal of goods into and from the packaging unit even more flexible.

Preferably, a first filling/removal direction runs in the direction of gravity and a second filling/removal direction runs perpendicularly to the direction of gravity. One can then use, for example, an automatic machine or an automatic handling device to insert goods into the packaging unit from above, i.e., in the direction of gravity. During removal, the goods can then be removed from or pushed out of the packaging unit transversely to the direction of gravity so that no forces are required here to lift the goods. This is particularly advantageous if one wants to have an operator perform the removal. It is also possible to provide for insertion from the side and removal from the top, or to provide for insertion and removal from the side or top in the same way.

Figure 2:
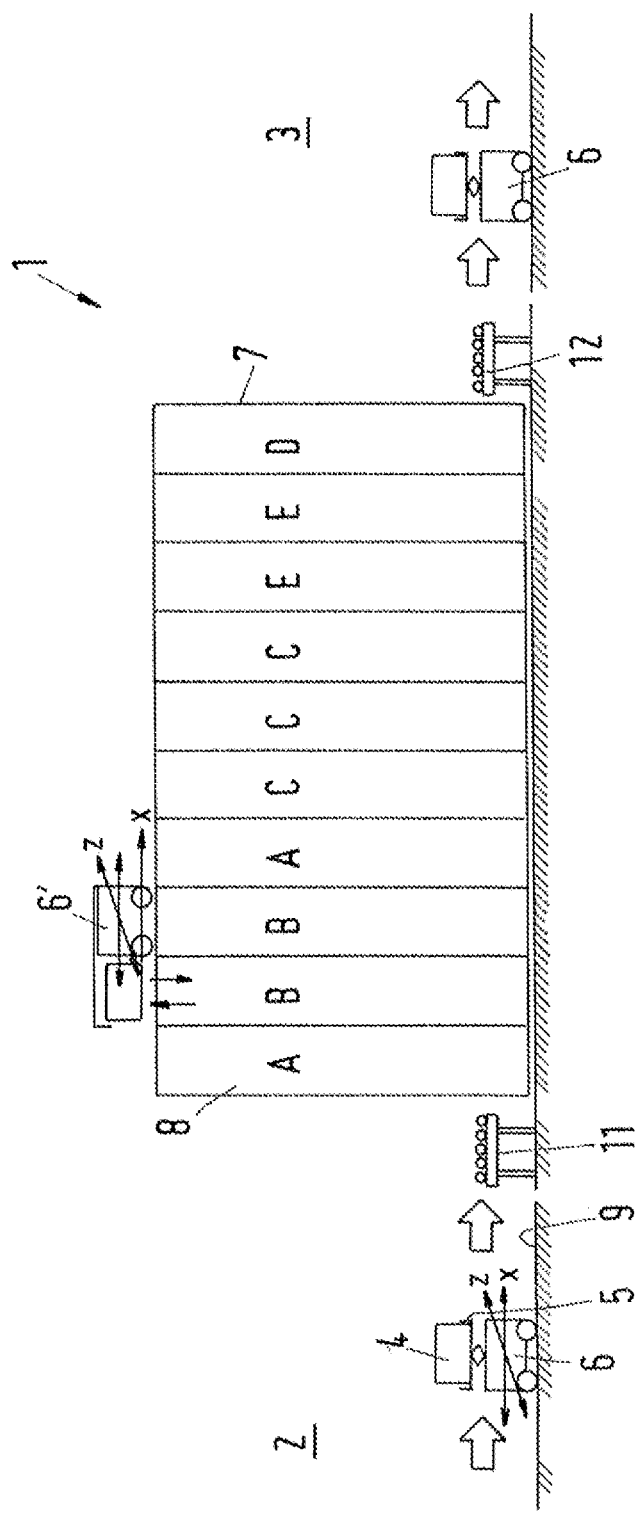
Figure 5:
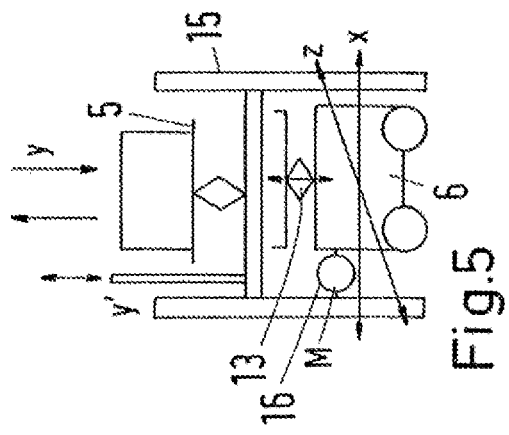
Figure 4:
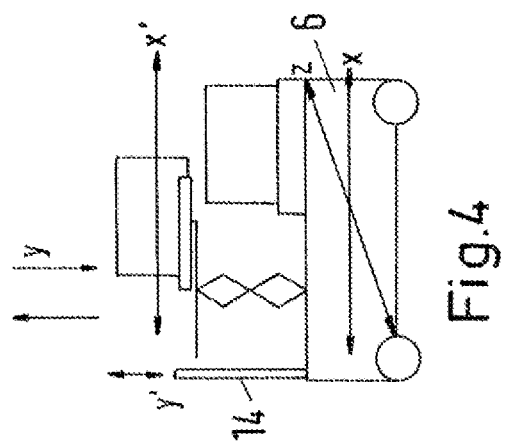
Figure 3:
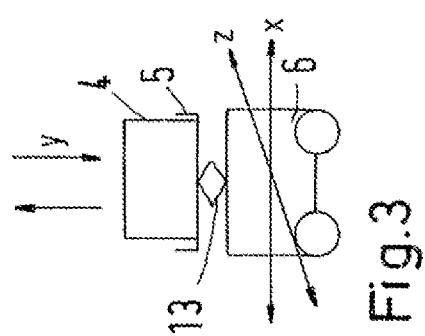
Figure 6:
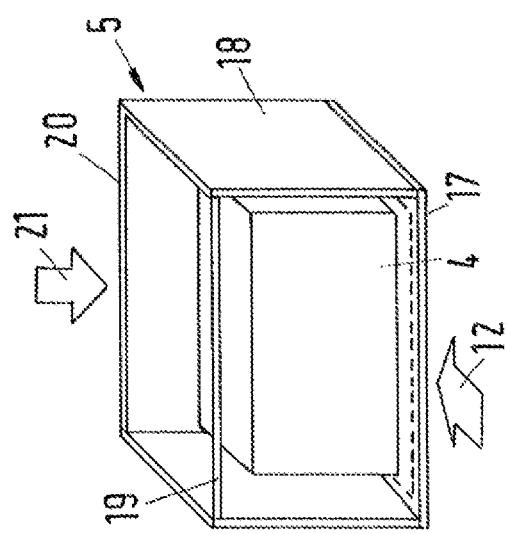
Figure 7:
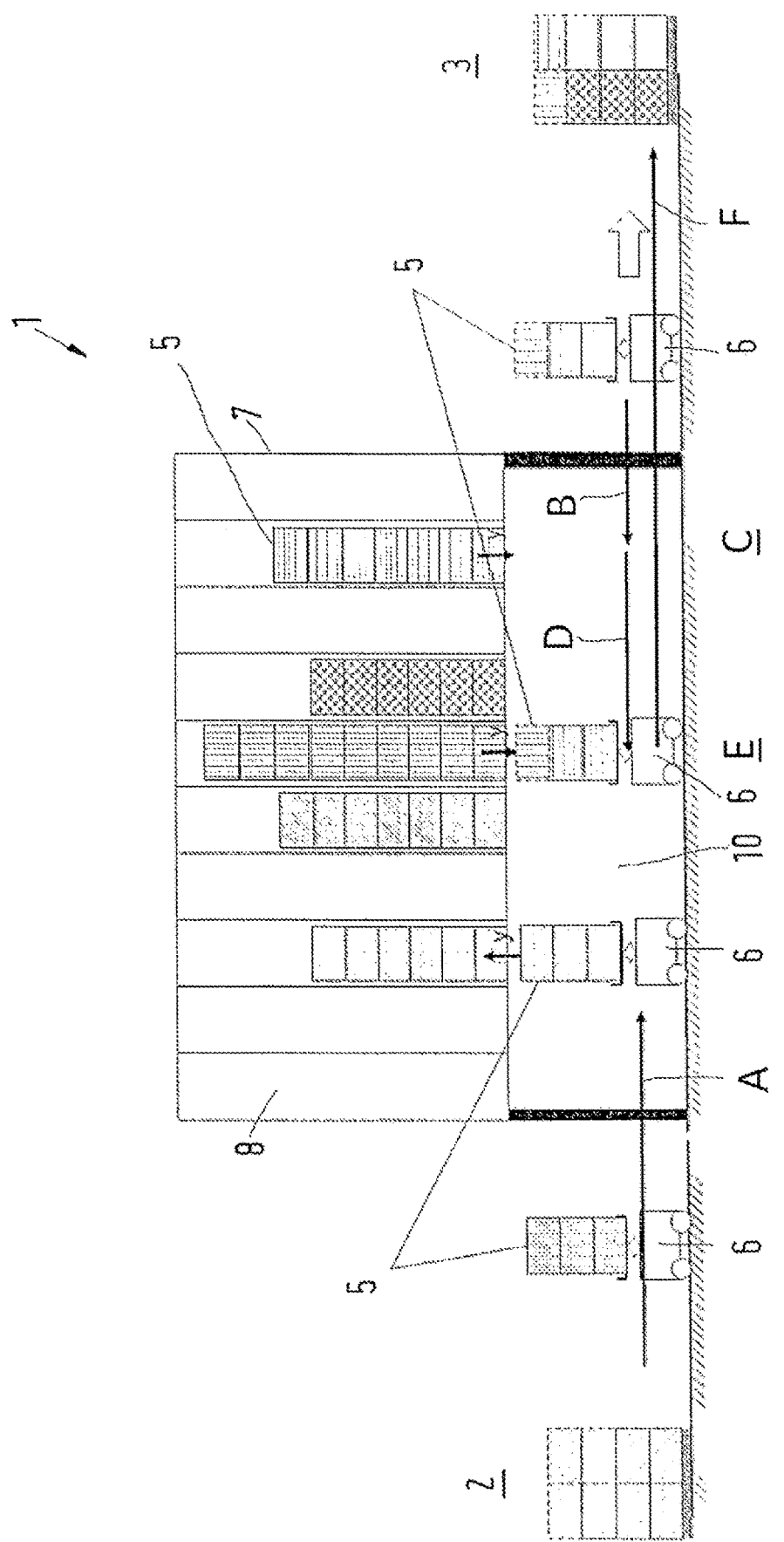

The invention is described below with reference to preferred exemplary embodiments in conjunction with the drawing. The following are shown therein:

FIG. 1 a first embodiment of a storage arrangement,
FIG. 2 a second embodiment of a storage arrangement,
FIG. 3 a first embodiment of a loading vehicle,
FIG. 4 a second embodiment of a loading vehicle,
FIG. 5 a loading vehicle with a rack, and
FIG. 6 a schematic illustration of a packaging unit, and
FIG. 7 a third embodiment of a storage arrangement.

FIG. 1 shows a schematic illustration of a storage arrangement 1 with an incoming goods area 2 and an outgoing goods area 3. At the incoming goods area 2, goods 4 are inserted into the storage arrangement 1 and removed from an inbound delivery container (not shown in more detail). The inbound delivery container may, for example, be a pallet on which a plurality of similar goods 4 is arranged. The goods 4 are removed from the inbound delivery container and transferred into a packaging unit 5, shown in more detail in FIG. 6. The packaging unit 5 is transported into a block storage unit 7 by means of a loading vehicle 6, which is designed as a driverless transport vehicle. The block storage unit 7 has multiple stacking compartments 8, in which the packaging units 5 can be stacked. In other words, each stacking compartment 8 is capable of receiving a multiplicity of packaging units 5 in the form of a stack. The prerequisite for this is that the packaging units 5 are stackable. For stacking, they therefore have a stacking geometry which is arranged at the bottom in the direction of gravity and interacts with a stacking geometry provided at the top of another packaging unit in the direction of gravity. It is expedient that all packaging units 5 are of the same design.

The packaging units 5 are held in place by a holding device (not shown in more detail) at the lower end of the respective stacking compartment 8. For this purpose, the packaging unit to be stored is lifted until it has passed the holding device. During the subsequent lowering process, the holding device grips the then lowermost packaging unit 5 and holds it in place.

For retrieval, the loading vehicle 6 lifts the lowermost packaging unit in a stacking compartment 8 until this packaging unit 5 is released from the holding device. The holding device is then held open until the lowermost packaging unit has been lowered past it and then grips the next packaging unit above it, such that such previously penultimate packaging unit then forms the lowermost packaging unit 5.

It may also be provided to remove multiple packaging units 5 from a stack. In this case, a control mechanism must be provided, which keeps the holding device open until the desired number of packaging units has been removed from the respective stacking compartment 8.

The loading vehicle is not only used to insert the packaging unit 5 into the block storage unit 7. It is also used to remove the packaging unit 5 from the block storage unit 7 again and to feed it to the outgoing goods area 3.

The loading vehicle 6 can be moved in two directions on the floor 9, as shown by the arrows "X" and "Z" in FIG. 1. In the simplest case, only two directions, which are perpendicular to one another, are provided here. In a somewhat more elaborate embodiment, it can be provided that the loading vehicle 6 can be moved in virtually any two dimensions.

The loading vehicle 6 can also be used to drive the packaging unit 5 out of the block storage unit 7 and transport it to the outgoing goods area 3.

As mentioned above, the block storage unit 7 has multiple stacking compartments 8. The letters "A," "B," "C," "D," and "E" show in simplified form that each packaging unit contains 5 goods 4 of the same type. Each stacking compartment is thus "homogeneous."

The stacking compartments 8 are arranged in columns and rows in the manner of a matrix. Each stacking compartment 8 is thus located at an intersection between a column and a row.

The position within the matrix at which one can remove which of the goods A-E is thus clearly defined. Since the loading vehicle 6 can be moved in practically any direction, the goods A-E may be removed in an order that is required for the subsequent sequencing of the goods 4 at the outgoing goods area 3. The outgoing goods area thus specifies the sequence in which the packaging units 5 are removed from the block storage unit 7.

A loading compartment 10, into which the loading vehicle 6 can be moved, is arranged below the stacking compartment 8. The loading vehicle 6 inserts the packaging units 5 into the stacking compartments 8 from below and also removes them from the stacking compartments downward.

The loading vehicle 6 can be used not only to insert the packaging units 5 into the stacking compartments 8 and to remove them from there. In the exemplary embodiment shown in FIG. 1, the loading vehicle 6 can also be used to transport the packaging units 5 to the outgoing goods area 3.

FIG. 2 shows a modified embodiment of a storage arrangement 1, in which identical and corresponding elements are provided with the same reference signs.

Here, the block storage unit 7 also has multiple stacking compartments 8 in which goods A-E are arranged. Here as well, each stacking compartment 8 is homogeneous.

In contrast to the exemplary embodiment shown in FIG. 1, the stacking compartments 8 are loaded from above here. For this purpose, a loading vehicle 6' is provided, which can be moved on the upper side of the block storage unit 7 in the direction of gravity.

For transporting a packaging unit 5 provided with goods 4, another loading vehicle 6 is provided, which is movable on the floor 9 and transports the packaging unit 5 from the incoming goods area 2 to a staging station 11. From the staging station 11, the loading vehicle 6' can pick up the packaging unit 5 and transport it upward. Once the packaging unit 5 has arrived above the block storage unit 7, it can be distributed to the individual stacking compartments 8.

Similarly, a dispensing station 12 is provided on the other side of the block storage unit 7, at which station the loading vehicle 6' can dispense a packaging unit 5 removed from the block storage unit 7. From there, it can be transported to the outgoing goods area 3 by another loading vehicle 6.

Here, the staging station 11 and the dispensing station 12 are arranged on different sides of the block storage unit 7 for reasons of clarity. The two stations may well be arranged on the same side of the block storage unit 7. They may also be arranged on sides that are perpendicular to one another.

FIG. 3 shows a first embodiment of a loading vehicle 6 that can be moved in the two directions "X" and "Z." With reference to the illustration of FIG. 3, these directions are from left to right (direction "X") and perpendicular to the drawing plane (direction "Z"). The loading vehicle 6 has a lifting device 13, with which the packaging unit 5 with the goods 4 can be moved in the direction of gravity and against the direction of gravity, which is shown by arrows "Y."

If the loading vehicle 6 is moved on the upper side of the block storage unit 7, the transport of the packaging unit 5 takes place downward for storage and upward for retrieval. This is not shown in FIG. 3.

The loading vehicle 6 shown in FIG. 3 can store a single packaging unit 5 in the block storage unit 7, remove it from there and transport it.

FIG. 4 shows a modified embodiment, with which the loading vehicle 6 can transport two packaging units simultaneously. The directions correspond to those in FIG. 3.

In addition, the loading vehicle 6 has an opener 14 that can be moved in a direction Y' in order to hold the above-mentioned holding device open until the desired number of packaging units 5 has been removed.

FIG. 5 shows another option for transporting packaging units 5.

In this case, the loading vehicle 6 transports a rack 15, which in turn stores the packaging units 5 in the stacking compartments 8 or removes them therefrom. The directions correspond to those in FIG. 3.

The loading vehicle 6 is provided with a motor (not shown), which can operate the lifting device 13.

The rack 15 can be designed as an "active rack." In this case, the unit 16 is a motor attached to the rack and comprising a power supply. In this way, the rack can carry out removal and dispensing operations autonomously without auxiliary drive by the vehicle, in that the motor M moves the lifting unit 13', which is connected to the rack 15, below the packaging unit 5 by means of a mechanical power transmission device (not shown).

The rack 15 can also be designed as a "passive rack." In this different case, the unit 16 is designed as a coupling device by means of which the driving force and power supply for the movement of the lifting device 13' is provided by the vehicle 6. The corresponding vehicle part couples to the unit 16, which moves the lifting unit 13', which is connected to the rack 15, below the packaging unit 5 by means of a mechanical power transmission device (not shown).

An opener 14 analogous to FIG. 4 is attached to the rack 15 in such cases and fulfills the function described above.

FIG. 6 shows an example of a packaging unit 5 with goods 4 received therein. The packaging unit has a base 17 on which the goods 4 rest. Two side walls 18, which can be connected to one another by a strut 19 at the front side and a rear wall 20, stand up on the base. The rear wall 20 can also be replaced by a further strut 19. The side walls 8 are higher than the goods 4 so that multiple packaging units 5 can be stacked on top of one another. In the simplest case, the bottom side of the packaging unit 5 forms a planar geometry that can cooperate with a correspondingly planar geometry on the upper side of another packaging unit in order to form a stack.

In a manner not shown in more detail, a hinged wall can also be attached to the strut 19.

The base 17 can have an anti-slip device for the goods 4. In addition, an integrated lowering element, with which the goods 4 can be lifted during removal, can be provided. Moreover, the base 17 can have slots into which load handling devices can engage, or other recesses that allow lifting rams to be inserted.

The packaging unit 5 has two filling/removal directions 21, 22, which are perpendicular to one another. With the filling/removal direction 21, the goods 4 can be inserted into the packaging unit 5 from above or removed from there, for example with a gripper. The other filling/removal direction 22 is perpendicular thereto, i.e., also perpendicular to the direction of gravity. This makes it possible to remove the goods 4 from the packaging unit 5 or insert them there by pushing or pulling.

FIG. 7 shows a third embodiment of a storage arrangement 1. Identical and functionally identical elements are provided with the same reference signs.

The storage arrangement 1 in turn has a block storage unit 7 with multiple stacking compartments 8 in which the packaging units 5 can be stacked. Different hatchings illustrate packaging units 5 that each contain different items or goods. Accordingly, only one type of goods or items is arranged in each stacking compartment 8. The stacking compartments 8 are thus sorted by type.

The loading compartment 10 below the stacking compartments 8 is designed here in such a way that it is possible to drive a loading vehicle 6 with multiple packaging units 5 back and forth below the stacking compartments 8. This has several advantages.

As can be seen in the left half of FIG. 7, a loading vehicle 6 can remove multiple similar packaging units 5 from the incoming goods area 2 and transport them to a stacking compartment 8. Filling the stacking compartment 8 with similar packaging units 5 can then be accomplished in a shorter time.

This is represented by an arrow A.

The right half of FIG. 7 shows a retrieval operation.

A loading vehicle 6 is driven into the loading compartment 10 in the direction of an arrow B to a position C where it can pick up first packaging units 5. In the present exemplary embodiment, the loading vehicle 6 picks up two packaging units 5 here.

The loading vehicle 6 is then moved (arrow D) to another position E, where it can pick up a different packaging unit 5, which, however, contains a different type of goods or objects. The stack with the different packaging units (two of the same type and a different packaging unit 5) can then be moved to the outgoing goods area 3 (arrow F). This makes it possible to already carry out sequencing while the packaging units 5 are being collected, so that picking at the outgoing goods area 3 can be further simplified and accelerated.

In all embodiments, it is preferred if the stacking compartments 8 are only filled with similar packaging units 5, i.e., have a filling sorted by type.

However, it can also be provided that there are "mixed" stacking compartments 8 so that the loading vehicles 6 can gain access to a packaging unit 5 within a stack that is not located at the lower end of a stacking compartment 8 by relocating. Such a situation can occur if the utilization of the storage volume is more important than short travel times per loading vehicle and order.

With the block storage unit 7, it is possible to realize the sequencing of the goods without additional buffer storage and thus without additional space requirements.

The invention claimed is:

1. A method for operating a storage arrangement, comprising:
    inserting goods into the storage arrangement in an inbound delivery container at an incoming goods area;
    removing the goods from the inbound delivery container;
    transferring the goods from the inbound delivery container into a stackable packaging unit;
    temporarily storing the goods in the packaging unit in a block storage unit which has multiple stacking compartments, each of which is designed to receive a stack of packaging units; and
    removing the goods from the storage arrangement in a predetermined sequence in an outbound delivery container at an outgoing goods area, whereby the goods are removed from the block storage unit in a sequence predetermined by the outgoing goods area.

2. The method according to claim 1, wherein the packaging units in each stacking compartment contain the same type of goods.

3. The method according to claim 1, wherein the packaging units are inserted into the stacking compartments from below.

4. The method according to claim 3, wherein the packaging units are inserted into the stacking compartments and are removed from the stacking compartments by loading vehicles, which can be moved in a loading compartment below the stacking compartments.

5. The method according to claim 4, wherein the loading vehicles can be moved in at least two different directions.

6. The method according to claim 4, wherein the loading vehicles are used to transport the packaging units to a sequencing device upstream of the outgoing goods area.

7. The method according to claim 4, wherein loading vehicles that can simultaneously transport more than one packaging unit are used.

8. The method according to claim 4, wherein loading vehicles that transport racks are used, wherein the racks insert the packaging units into the stacking compartments and remove them from the stacking compartments.

9. The method according to claim 8, wherein racks that have their own lifting drive are used for a device, connected to the rack, for lifting and lowering the packaging units.

10. The method according to claim 8, wherein racks that are coupled by a coupling device to a drive in the loading vehicle are used in order to operate a device, connected to the rack, for lifting and lowering the packaging units.

11. The method according to claim 1, wherein a packaging unit that has at least two different filling/removal directions is used.

12. The method according to claim 11, wherein a first filling/removal direction runs in the direction of gravity and a second filling/removal direction runs perpendicularly to the direction of gravity.

13. The method according to claim 9, wherein the lifting drive has its own power supply.

* * * * *